Jan. 4, 1949.   L. J. BORDELON   2,458,245
UNDER-WING FUELING SYSTEM
Filed Jan. 20, 1947   2 Sheets-Sheet 1

INVENTOR.
Lawrence J. Bordelon
BY Thomas P. Mahoney

Jan. 4, 1949.  L. J. BORDELON  2,458,245
UNDER-WING FUELING SYSTEM
Filed Jan. 20, 1947  2 Sheets-Sheet 2
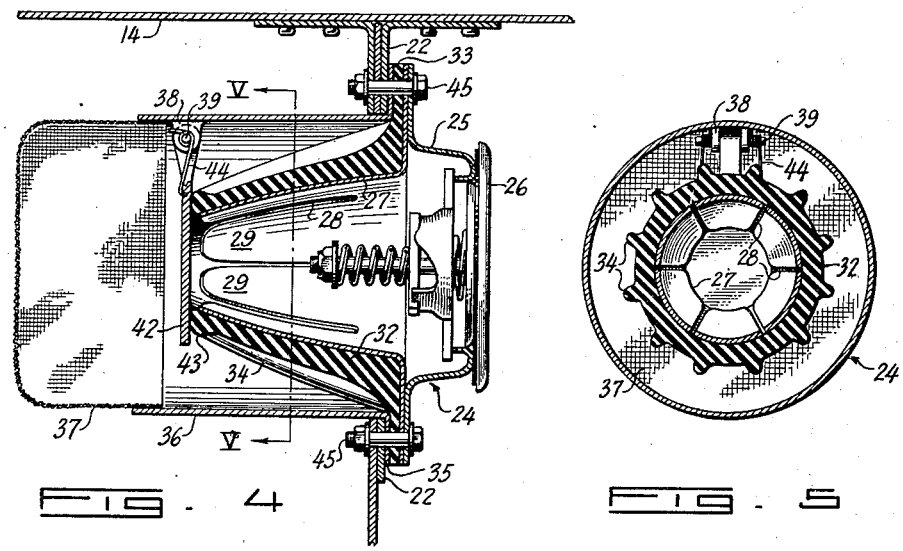
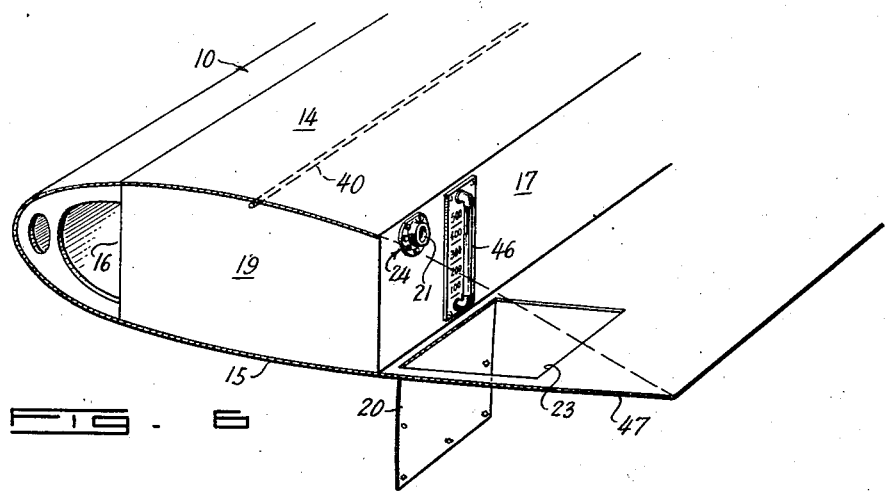
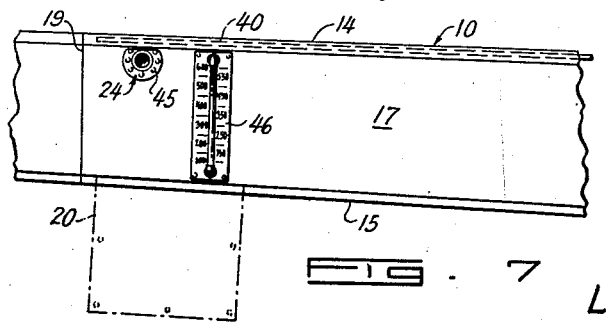
INVENTOR.
Lawrence J. Bordelon
BY
Thomas P. Mahoney Patented Jan. 4, 1949

2,458,245

UNITED STATES PATENT OFFICE 2,458,245

UNDERWING FUELING SYSTEM

Lawrence J. Bordelon, San Diego, Calif., assignor to Consolidated Vultee Aircraft Corporation, San Diego., Calif., a corporation of Delaware Application January 20, 1947, Serial No. 723,183

9 Claims. (Cl. 244—135)

1

This invention relates to improvements in aircraft refueling systems and more particularly to an aircraft refueling system adapted to permit the refueling of aircraft which carry their fuel in the wing from a position below the wing, rather than from above, as has previously been the case.

It is customary, at the present time, for most aircraft to carry their fuel load in the interior of the wing, contained in separate metal tanks, collapsible fuel cells or in fuel cells which are an integral part of the wing structure itself. The above mentioned fuel storing expedients have in common the fact that they are designed to be filled from the top through filler openings in the upper surface of the wing.

This peculiarity of aircraft fuel tank construction and installation necessitates that the attendant who fuels the aircraft climb up and out on the surface of a wing which provides, at best, a hazardous and uncertain footing. In addition, a heavy fuel hose and nozzle must be dragged up and over the upper surface of the wing with the consequent risk of abrading the wing surface or of dropping the fueling nozzle thereupon, thus causing considerable damage to the wing skin.

The mechanic, as he fills the fuel tank from above has absolutely no visual or other indication as to how far the refueling process has progressed and it is not unusual for a fuel tank to be overfilled with consequent wastage of fuel and the creation of a fire hazard. To determine whether the required amount of fuel is in the tank at the conclusion of the fueling process, the mechanic utilizes the primitive expedient of a dipstick which he inserts in the filler opening of the tank to secure an indication of the fuel level therein.

Upper wing surface fueling always involves the possibility that the attendant may inadvertently drop a tool or bolt into the filler opening which, if not reported, will create a dangerous condition or, if reported, will involve an expensive maintenance operation before it is removed.

The fact that the filler opening in conventional refuelling systems is located in the upper surface of the wing has also necessitated that great care be taken to insure that filler caps are properly installed and tight before take-off. There is always the chance that a loose or leaky filler cap will permit fuel to be drawn from the tank because of the vacuum created by the passage of air over the wing while the aircraft is in flight.

Thus, upper surface of the wing refueling has been, at best, a time consuming and, sometimes, dangerous expedient. To solve the problem, valve

2 openings in the bottom of fuel tanks have been considered to permit their being refueled from the under surface of the wing. The cost, weight and uncertainty of such devices, necessitating, as they do, special valves, couplings, fuel nozzles and pumping systems, have been factors militating against their acceptance.

The present invention, in its provision of simple means to accomplish the fact of under surface of the wing refueling, eliminates previous obstacles to the accomplishment of that end and permits, in the case of moderate size aircraft, that they be refueled by an attendant standing on a small platform a short distance from the surface of the ground.

It is, therefore an object of this invention to provide an aircraft refueling system which is adapted to permit the refueling of the aircraft from a position below the wing with customary refueling equipment.

Another object of the invention is the provision of an under-wing aircraft refueling system which provides immediate indication of the amount of fuel within the tank simultaneously with the refueling process.

A further object of the invention is the provision of an under-wing aircraft refueling system which will permit the refueling of the aircraft with the engine running without incurring fire hazard or undue discomfort to the attendant.

An additional object of the invention is the provision of an under-wing aircraft refueling system which embodies fuel nozzle reception means adapted to prevent the exposure of the attendant to noxious fumes emanating from the fuel.

Other objects and advantages of the present invention will be made apparent by a consultation of the appended specification and accompanying drawings, in which:

Figure 4 is a vertical sectional view of a fuel nozzle reception means which is adapted to be utilized in conjunction with the present invention;

Figure 5 is a transverse sectional view of the fuel nozzle reception means taken on line 5—5 of Figure 4;

Figure 6 shows the installation of the under-wing fueling system in the rear of an integral fuel tank; and Figure 7 is a vertical sectional view of the wing showing the installation of the invention, as in Figure 6, on the rear spar of the wing, which also forms the rear wall of the integral fuel tank.

Figure 1:
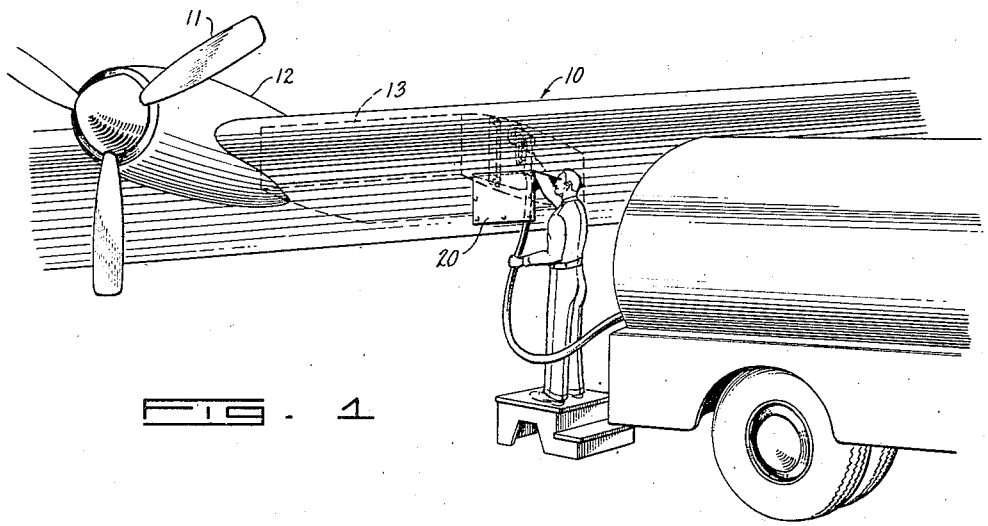
Figure 1 is a perspective view showing one embodiment of the invention in actual use.

There is shown in the drawings, Figure 1, a portion of a wing 10 which forms the lifting surface for a large monoplane type aircraft which is attached to a fuselage of conventional type (not shown). Installed in the leading edge of the wing 10 is a rotary type engine (not shown) which provides the lifting power for the aircraft by driving a propeller 11 mounted thereon. The engine is housed in a nacelle 12 which is of streamed-lined configuration and adapted to cut down the resistance which the engine would create as it passed through the air.

The wing 10, which is shown in the drawings, possesses an angle of incidence of about 3 or 4° and has embodied therein an integral fuel tank or fuel storage means 13 which is an essential part of the structure of the wing 10 and which is positioned, in this case, outboard of the nacelle 12. Although the under-wing fuel system which forms the present invention is described in conjunction with an integral fuel tank, it is, of course, to be understood that the invention can be incorporated with equal success in separate metal tanks and collapsible fuel cells and in other types of fuel containers, The tank 13 comprises a top 14 which is formed by the upper surface of wing 10 and a bottom 15 which is formed by the under surface of the wing. The front wall 16 of the tank is formed by the front spar and the back wall 17 of the tank is formed by the rear spar. The inboard side wall 18 is formed by a bulkhead and the outboard side wall 19 is formed by a similar bulkhead. Thus, all the component elements which form the tank 13 serve as structural members and suitable reinforcing members 22 assist the tank construction 13 in performing its structural weight and stress bearing function.

Figure 2:
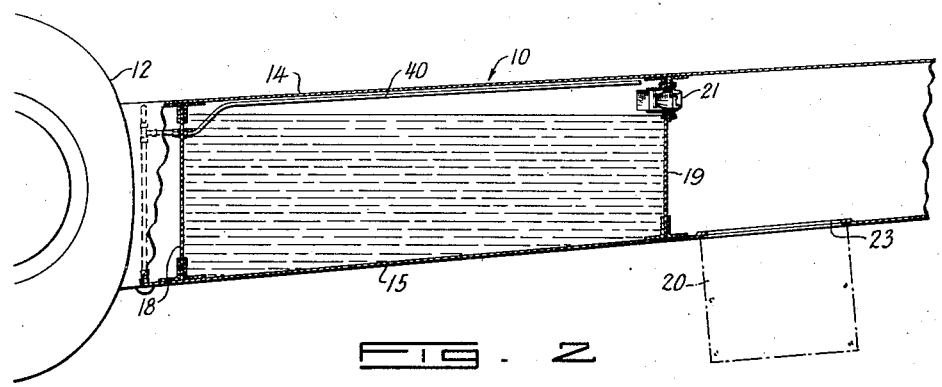
Figure 2 is a vertical sectional view of an aircraft wing, outboard of the nacelle, showing the present invention installed in conjunction with an integral fuel cell.
Figure 3:
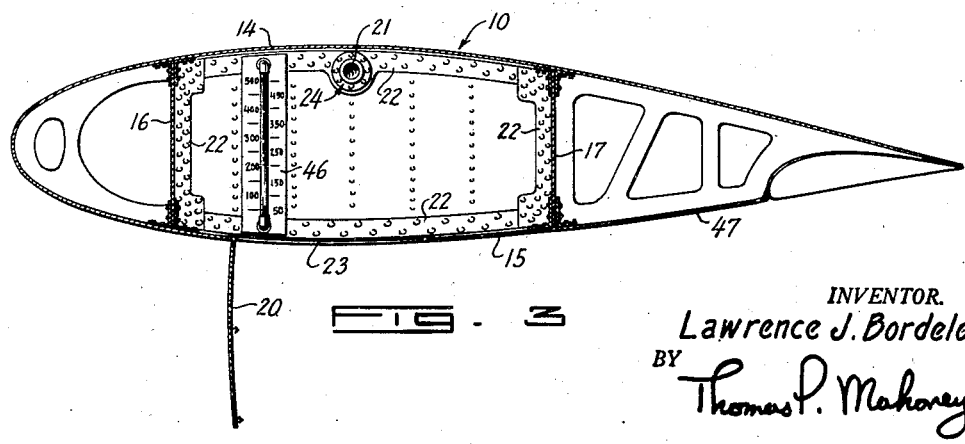
Figure 3 is a vertical sectional view showing a visual fuel quantity indicator installed on the bulkhead which forms the outboard side of the integral fuel tank.

As shown in Figures 2 and 3, there is formed in the under surface of the wing 10 adjacent to the outboard side wall 19 of tank 13 access opening or means 23 of suitable size which is normally closed by a door or cover 20 and which permits access to be had to the interior of the wing 10. Said door 20, when closed, forms a portion of the under surface of the wing. Mounted on outboard side wall 19 and penetrating into the interior of tank 13 through an opening formed in said outboard side wall is a filler nozzle receptacle assembly or fuel reception means 24. The opening of fuel reception means 24 communicates with that portion of the interior of the wing which is exterior to the tank structure proper and it is thus possible to fill the tank or fuel storage means from a position within the interior of wing 10. The angle of incidence of the wing 10 is such that when fuel is fed into the tank 13 through fuel reception means 24 the fuel level is highest at the inboard side wall 18 and when the fuel storage means 13 is filled to the established level the inner portion of the filler nozzle reception means 24 will be above the surface of the fuel.

As shown in Figures 4 and 5 filler nozzle or fuel reception means 24 comprises a mounting flange or means 25 which is adapted to receive a filler cap 26. Copper-brazed or similarly affixed to mounting flange 25 in a frusto-conical resilient compressive sealing element 27 which projects into the interior of tank 13 and which has formed therein a circumferentially arranged series of slots 28 formed axially thereof in such a manner as to define individual fingers 29. Since the frusto-conical sealing means 27 is formed preferably of spring steel, or a material possessing similar qualities, there is an inherent tendency in fingers 29 to move inwardly toward the axis of sealing means 27.

Vulcanized or otherwise mounted on and about the exterior of frusto-conical sealing member 27 is a rubber sheath or sleeve means 32 which has a flanged portion 33 adapted to be secured against the outboard side wall 19 of the tank 13. Several purposes are served by the rubber sheath 32; it prevents noxious fumes emanating from the fuel from leaking out into the interior structure of the wing and harmfully affecting the attendant and it also augments the compressive force of spring steel fingers 29. Resilient, compressive sealing element 27 and sheath 32 also serve to prevent the pressure built up in fuel storage means or tank 13 during the refueling process from forcing fumes and fuel out of the tank past a filler nozzle inserted in said sealing element 27 and cause the fumes to flow to atmosphere through a vent line 40. Circumferentially disposed integral ribs 34 serve to reinforce the structure of the sheath 32. Mounted adjacent flange 33 of sheath 32 is flanged portion 35 of a cylindrical, auxiliary mounting means 36 which projects into the interior of tank 13 and surrounds frusto-conical sealing means 27 and its associated sheath 32. A strainer 37 is sustained at the forward portion of cylindrical element 36 and prevents impurities of any considerable size from being carried by the fuel into the interior of the tank and also eliminates the possibility that any of the elements embodied in the fuel reception means 24 may fall into the tank 13.

When a conventional fuel nozzle is inserted into fuel nozzle reception assembly 24 after the removal of filler cap 26 from mounting flange 25, spring steel fingers 29 are expanded together with rubber sheath 32 by the forward portion of the fuel nozzle. Naturally, if the fingers 29 were not surrounded by rubber sheath 32 noxious fumes from the fuel would pass through the interstices or slots 28 created by the expansion of fingers 29. The leakage of such noxious fumes into the interior of the wing would cause both a fire hazard and a source of injury to the attendant refueling the aircraft.

Since the pressure built up by the pouring of gas into tank 13 must be relieved there is provided a vent line 40 which communicates with the atmosphere and which also serves to discharge from the tank 13 fumes which have been prevented by filler nozzle receptacle assembly 24 from leaking past the filler nozzle into the interior of the wing 10.

Mounted on the interior, auxiliary mounting element 36 as by means of a boss 38 and a pin 39 is a flapper valve means 42 which is adapted to seat against a bead 43 formed on the outer edge of rubber sheath 32. A spring 44 serves to bias the flapper against the end of rubber sheath 32 and to close off the interior of frusto-conical sealing means 27 from communication with the interior of tank 13. However, the introduction of the filler nozzle will force up the flapper 42 and permit fuel to be fed into tank 13.

Ordinarily, however, the flapper 42, under the action of spring 44, assumes its closed position. Thus closed it prevents the sloshing of fuel into the interior of frusto-conical member 27 should rough air conditions cause the violent motion of the fuel within tank 13. Further, it is conceivable that, in emergencies or overload conditions, it might be desirable to fill tank 13 beyond predetermined limits. In such a case, fuel could be fed into tank 13 above the level of fuel nozzle reception assembly 24 and the closing of flapper 42 upon the withdrawal of the filler nozzle would seal off the filler nozzle reception means 24 from the interior of tank 13 and prevent the leakage of fuel out of the tank filler opening despite the fact that the level of the fuel was above the tank filler opening. Thus no fuel will be able to accumulate within the interior of filler nozzle reception assembly 24 and the removal of filler cap 26 from filler cap mounting flange 25 will not be accompanied by a dangerous and wasteful discharge of fuel from the tank filler opening.

Filler nozzle reception means may be mounted through tank filler opening 21 on reinforcing members 22 by means of bolts 45 and removed therefrom for inspection or repair as an assembly by the removal of said bolts.

Mounted on the outboard side wall 19 of the tank 13 adjacent to the tank filler opening 21 and adapted to communicate with the interior of said tank in order that an accurate indication of the contents of the tank 13 may be obtained is a fuel gage 46. Fuel gage 46 is subject to the observation of the attendant during the entire refueling process and he is able to accurately control the amount of fuel fed into the tank since he does not have to rely upon guess work or the antiquated dipstick method. Of course, the possibility of inadvertently dropping tools into the tank filler opening is completely eliminated and it is obvious that such an action would have to be a willful and malicious one.

Shown in Figures 6 and 7 is an installation of the present invention in the back wall 17 of tank 13. As was indicated above, back wall 17 comprises a portion of the rear spar which is an essential structural element of the wing. The invention is similar in every way to that discussed above but a considerable advantage may be gained from the fact that access opening 23 may be cut into the trailing edge portion 47 of wing 10. Since the trailing edge portion of wing 10 need not bear any major structural loads the edge of access opening 23 need not be reinforced as is the case when the outboard side will 19 of tank 13 was used. Further, access door 20 need not serve as a structural element and there is thus a considerable saving in both weight and cost.

Although the present invention has been discussed and shown in use in a monoplane type aircraft whose wings possess a dihedral of about 3°, it is obvious that the invention could be used in conjunction with wings possessing a greater or less or no dihedral at all. As indicated, previously the system as shown can be used and installed in a wide variety of fuel tanks and it is not intended that the invention be limited to use with integral fuel tanks. Since the invention is applicable to all types of winged aircraft, it is conceivable that it might be utilized in such aircraft as flying wings, etc.

It is also conceivable that a number of interconnected fuel tanks may be positioned within the interior of each wing adapted to be filled from the filler opening in one of the tanks by the process of shifting fuel from one tank to the other. The number of tanks which are filled by the utilization of the present invention is irrelevant to its essential mode of construction and manner of utilization.

There is thus provided an under-wing fueling system which, by the incorporation of simple and inexpensive means, will permit an aircraft to be fueled from the under side of the wing rather than from the top, as has been and is at present the case. It will remove many of the hazards inherent in present day fueling procedures, reduce overall refuelling time and permit the attendant to refuel the aircraft from a comparatively safe and sheltered position below the under surface of the wing.

It is obvious that the embodiment of the invention shown and discussed above has been utilized for the purpose of describing the method of construction and mode of operation of the invention and it is conceivable that changes can be made in said structure which will still fall within the scope of the appended claims.

What I claim is:

1. In an aerial vehicle having a wing, a tank for the storage of fuel located in the wing, said wing having an access opening located in the under surface thereof juxtaposed to one side of said tank and fuel reception means communicating with the interior of said wing and mounted on said tank adapted to be accessible from said access opening for fueling said tank from below said wing.

2. In an airplane having a wing, a tank for the storage of fuel located in the wing, said wing having an access opening located in the under surface thereof juxtaposed to said tank and fuel reception means mounted on said tank and located within the interior of the wing adapted to be accessible from said access opening for fueling said tank from below said wing.

3. In an aerial vehicle having a wing, a tank for the storage of fuel located in the wing, said wing having an access opening located in the under surface thereof juxtaposed to one side of said tank and fuel reception means opening into the interior of said wing, mounted on said tank, said fuel reception means adapted to be accessible from said access opening for fueling said tank from below said wing.

4. In an airplane having a wing, a tank for the storage of fuel located in the wing, said wing having an access opening located in the under surface thereof juxtaposed to said tank, a door for closing said access opening and adapted when closed to form a part of the under surface of said wing, and fuel reception means mounted on said tank within the interior of said wing adapted to be reached through said access opening for fueling said tank from below said wing.

5. A fueling system for an aircraft having a wing comprising fuel storage means, including a substantially vertical wall, located within the interior of said wing, said wing having an access opening in the under surface thereof juxtaposed to said fuel storage means, fuel reception means mounted on said substantially vertical wall of said fuel storage means adapted to be reached through said access opening from below said wing to permit the replenishment of the fuel in said fuel storage means.

6. A fueling system for an aircraft having a wing comprising fuel storage means, including a substantially vertical wall, located within the interior of said wing, said wing having an access opening in the under surface thereof juxtaposed to said fuel storage means, fuel reception means mounted on said vertical wall of said fuel storage means opening into the interior of said wing and adapted to be reached through said access opening from below said wing to permit the replenishment of the fuel in said fuel storage means.

7. A fueling system for an aircraft having a wing comprising fuel storage means located within the interior of said wing, said wing having an access opening in the under surface thereof juxtaposed to said fuel storage means, fuel reception means mounted on said fuel storage means, the opening of said fuel reception means communicating with the interior of said wing, sealing means incorporated in said fuel reception means adapted to prevent the leakage of fuel fumes into the interior of said wing, said fuel reception means being adapted to be reached from said access opening to permit the replacement of the fuel in said fuel storage means.

8. In combination in an airplane having a wing, a tank for the storage of fuel mounted in the wing, said tank having substantially vertical walls, said wing panel having an access opening located in the under surface thereof and fuel reception means mounted on one of said substantially vertical walls of said tank within the interior of said wing, said fuel reception means having an entrance opening communicating with the interior of said wing and adapted to be reached through said access opening for fueling said tank from below said wing.

9. A refueling system for an aircraft having a wing comprising fuel storage means having substantially vertical walls located within the interior of said wing, said wing having an access opening located in the under surface thereof, a door for closing said access opening and adapted when closed to form a part of the under surface of said wing, and fuel reception means mounted on one of said substantially vertical walls of said fuel storage means, said fuel reception means having an entrance opening communicating with the interior of said wing and adapted to be reached through said access opening to permit the replenishment of the fuel in said fuel storage means.

LAWRENCE J. BORDELON.

REFERENCES CITED

The following references are of record in the file of this patent:

UNITED STATES PATENTS

| Number | Name | Date |
|---|---|---|
| 393,418 | Carlson | Nov. 27, 1888 |
| 2,234,393 | Amiot | Mar. 11, 1941 |
| 2,403,749 | O'Neal | July 9, 1946 |
| 2,414,909 | Snyder | Jan. 28, 1947 |

FOREIGN PATENTS

| Number | Country | Date |
|---|---|---|
| 629,362 | France | July 25, 1927 |